D. M. CUMMINGS, Dec'd.

Assignor, by mesne assignments, to COMPOUND LUMBER COMPANY.

COMPOUND LUMBER.

No. 10,599. Reissued May 26, 1885.

Attest:
Court A. Cooper.
Wm. F. Sayers.

D. M. Cummings
Inventor.
Compound Lumber Co. assee
By Foster & Freeman
attys

N. PETERS, Photo-Lithographer, Washington, D. C.

UNITED STATES PATENT OFFICE.

COMPOUND LUMBER COMPANY, OF NEW YORK, N. Y., ASSIGNEE, BY MESNE ASSIGNMENTS, OF DANIEL M. CUMMINGS, DECEASED.

COMPOUND LUMBER.

SPECIFICATION forming part of Reissued Letters Patent No. 10,599, dated May 26, 1885.

Original No. 183,042, dated October 10, 1876. Reissue No. 8,807, dated July 15, 1879. Application for reissue filed April 21, 1885.

*To all whom it may concern:*

Be it known that DANIEL M. CUMMINGS, deceased, formerly of Enfield, in the county of Grafton and State of New Hampshire, did invent certain new and useful Improvements in Compound Lumber, of which the following is a full, clear, and exact description, that will enable others skilled in the art to which it appertains to make and use the same, reference being had to the accompanying drawings, and to the letters of reference marked thereon, which form a part of this specification.

The object of the invention is to provide a composite lumber in which a backing of cheap wood is united to a face of more expensive material, in the manner hereinafter described, so as to form a single structure, the backing and face consisting each of one or more sections or varieties of wood, as utility or ornament may require.

Figure 1:
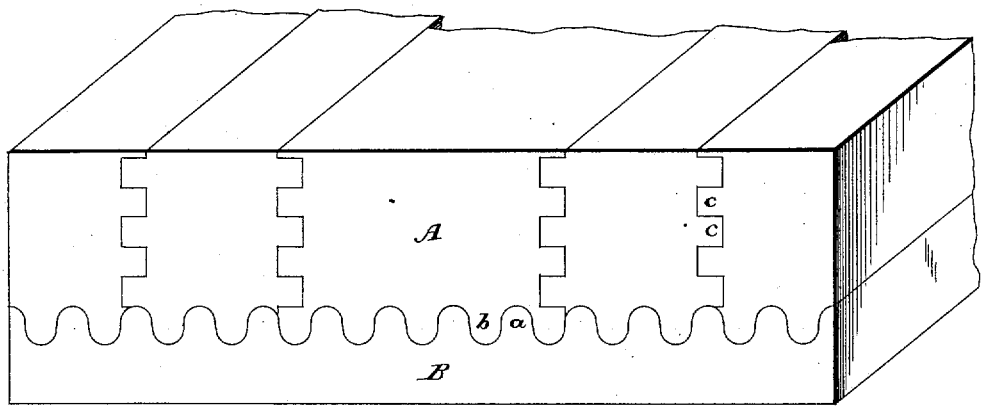
Figure 2:
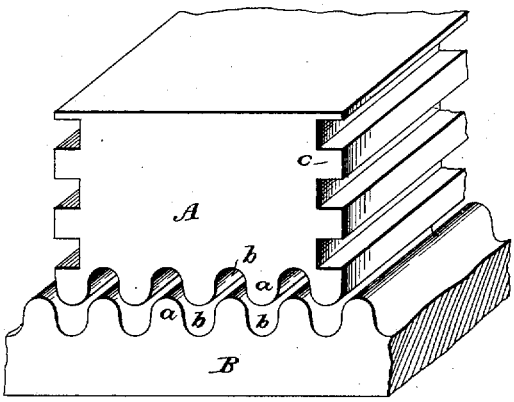

In the accompanying drawings, Figure 1 is a perspective view of a piece of composite lumber made in accordance with the invention, and Fig. 2 a view showing sections of the lumber detached.

A represents the backing, and B the face portion, of the lumber, the latter consisting of the expensive wood required for giving finish and ornamental effect, and the former being composed of cheaper material, which imparts the requisite body, and in some instances adds to the strength. At the back of the facing section are formed a series of alternate ribs, *a*, and grooves *b*, adapted to coinciding ribs and grooves of the backing, so that when the two are united under pressure the ribs of one section will enter the grooves of the other, the parts being so proportioned that the friction between the sides of the tongues will serve in many instances to bind the sections together. For greater security, glue or other cement may be used, a very small portion of which will unite the different parts of the structure to form practically one piece.

The backing and facing may each consist of a single piece of wood, or may be built up of a series, each section of which is united to the others in the same manner as the backing and facing are united to each other, and these sections may consist of wood of different kinds or colors, as utility or ornament may render advisable.

The composite lumber, while much cheaper than solid lumber of corresponding size of the same material as the facing, may be applied and used in the same manner as the latter, and in many instances is superior thereto, being stronger, less liable to warp and shrink, and in some cases requiring less labor in the construction of articles made therefrom—as, for instance, in the construction of heavy doors, which may be made directly from the composite lumber, instead of making the body first of pine or other cheap wood and then facing or veneering the latter with the more expensive material, as usual.

It will also be apparent that the composite lumber may be used with advantage in the manufacture of moldings and for ornamental purposes, as in parquetry, &c., the cutting of the lumber transversely or at various angles serving to display the different materials of which it is composed in an ornamental manner at the cut surfaces.

We are aware that different kinds of wood have been united through the medium of dovetailed grooves and projections; but it is apparent that, owing to the necessity of sliding the dovetails into the grooves, such a mode of union is impracticable in a compound lumber where strips of many feet in length must be joined.

We claim as the invention—

As a new article of manufacture, compound lumber composed of different woods united at their inner faces by means of parallel tongues and grooves, substantially as described and shown, for the purpose set forth.

In testimony whereof I affix my signature in presence of two witnesses.

C. M. THOMPSON,
*Secretary of the Compound Lumber Co.*

Witnesses:
THOS. D. CONYNGHAM,
HOMER R. BALDWIN.